H. MILLER.
FEEDING AND DELIVERING MECHANISM FOR SHEET METAL WORKING PRESSES.
APPLICATION FILED MAR. 30, 1918.
1,344,810.
Patented June 29, 1920.
3 SHEETS—SHEET 1.
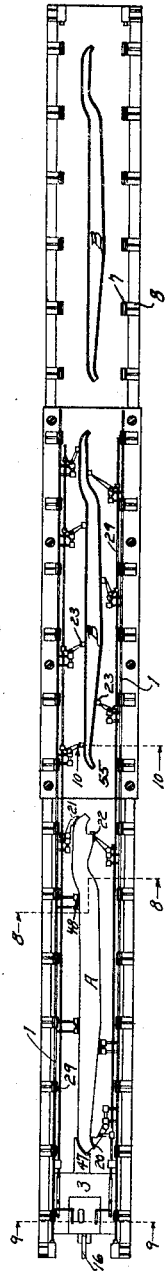

H. MILLER.
FEEDING AND DELIVERING MECHANISM FOR SHEET METAL WORKING PRESSES.
APPLICATION FILED MAR. 30, 1918.
1,344,810.
Patented June 29, 1920.
3 SHEETS—SHEET 2.
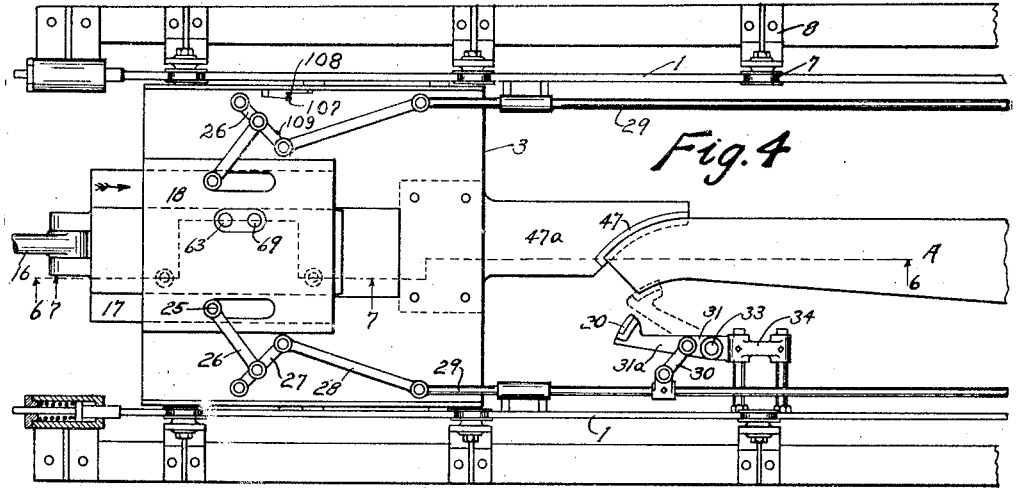
Fig. 4
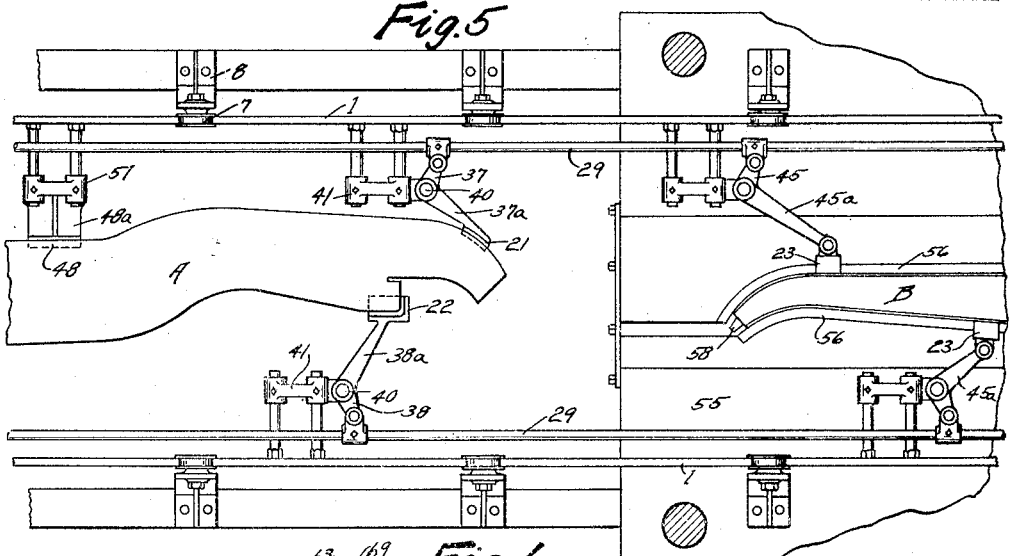
Fig. 5
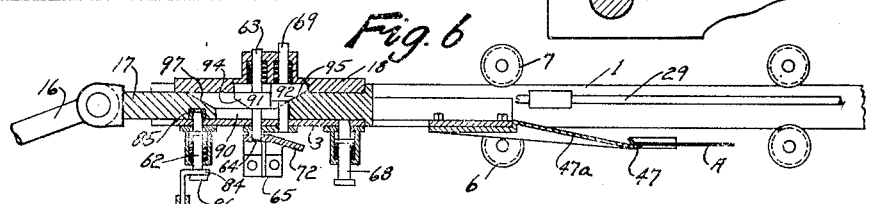
Fig. 6
Fig. 7
WITNESSES:
Arthur H. Riebe
Frederick W. Nolte
INVENTOR
Henry Miller
BY
Erwin & Wheeler
ATTORNEYS

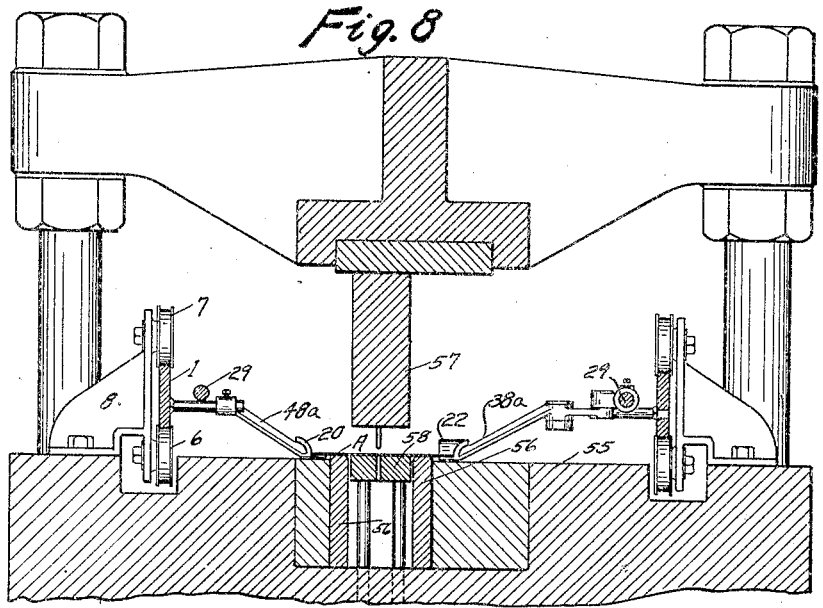
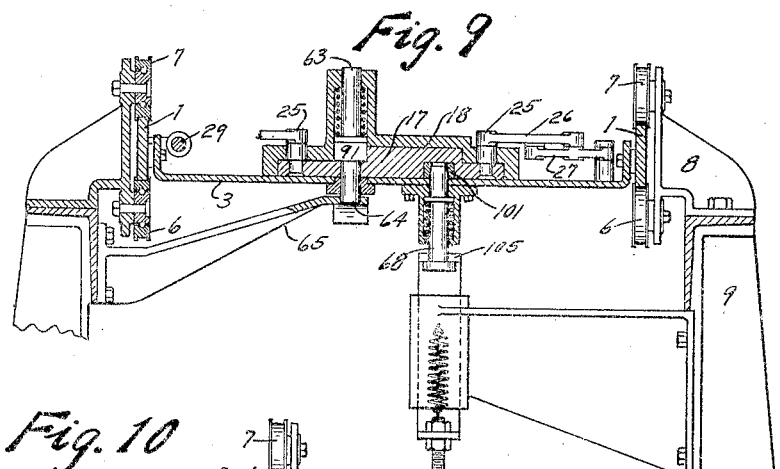
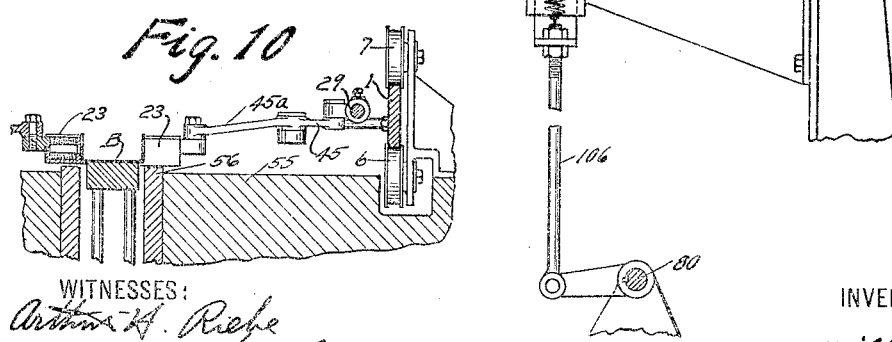

UNITED STATES PATENT OFFICE.

HENRY MILLER, OF MILWAUKEE, WISCONSIN, ASSIGNOR TO A. O. SMITH CORPORATION, OF MILWAUKEE, WISCONSIN, A CORPORATION OF NEW YORK.

FEEDING AND DELIVERING MECHANISM FOR SHEET-METAL-WORKING PRESSES.

1,344,810.     Specification of Letters Patent.     Patented June 29, 1920.

Application filed March 30, 1918. Serial No. 225,790.

*To all whom it may concern:*

Be it known that I, HENRY MILLER, a citizen of the United States, residing at Milwaukee, county of Milwaukee, and State of Wisconsin, have invented new and useful Improvements in Feeding and Delivering Mechanism for Sheet-Metal-Working Presses, of which the following is a specification.

My invention relates to improvements in blank feeding mechanism with particular reference to mechanism for feeding blanks to presses, such, for example, as drawing presses, piercing presses, etc.

The primary object of my invention is to provide for mechanically delivering blanks to, and removing them from, a press, whereby accuracy in positioning each blank between the working members of the press, (matrix and punch), may be attained, danger to workmen avoided, and whereby the operations of feeding-in and removing blanks may be accurately timed in synchronism with the movements of the movable working member of a continuously operating press, thereby enabling me to remove a completed blank or member, and simultaneously insert another blank between the working members of the press while the movable working member is out of the path of the blank, *i. e.*, while it is completing its retractive stroke and during the initial portion of its advancing or working stroke.

But while my primary object is to provide means for mechanically feeding work to, and removing it from, presses in a continuous succession of timed operations occurring in the intervals between the work shaping operations performed by the press, yet it is my purpose to provide a form of apparatus capable of general use wherever it is desired to employ reciprocatory feeding-in and removing mechanism capable of accurately positioning the work at the end of the feeding operation, and particularly in cases where the removal of one member or portion of the work is to take place simultaneously with the operation of feeding in the next member or portion.

Ancillary to the primary object of my invention, my object is to provide means for automatically stopping and positioning the feeding mechanism for a definite or timed interval at the end of each stroke; also to provide work engaging devices of differing character for engaging the work preparatory to the feeding-in operation, and for again engaging it preparatory to the feeding-out or delivery operation, whereby I am enabled to employ automatic work engaging devices adequate to the requirements of the work in its different stages of completion.

In the drawings—

Figure 1 is a plan view of a machine embodying my invention, showing the same on a reduced scale, and illustrating a set of blanks in the initial work engaging position, the work shaping position, and the delivery position respectively.

Fig. 2 is a side elevation of the same as used in connection with a drawing press, the floor being illustrated in section.

Fig. 3 is a detail view of the actuating mechanism for retracting the dowel pins, a fragment of the crank wheel being illustrated in section.

Figs. 4 and 5 are fragmentary plan views on a larger scale than Figs. 1 and 2, showing, respectively, the initial portion and the next succeeding portion of my improved feeding apparatus, a fragment of the press table or matrix being also illustrated in Fig. 5 and the punch operating rods being shown in cross section.

Figs. 6 and 7 are sectional views drawn, respectively, on lines 6—6 and 7—7 of Fig. 4.

Figs. 8 and 9 are sectional views drawn, respectively, on lines 8—8 and 9—9 of Fig. 1.

Fig. 10 is a sectional view drawn on line 10—10 of Fig. 1.

Like parts are identified by the same reference characters throughout the several views.

As illustrated in the drawings, my invention includes a blank holding conveyer or main slide, comprising a set of slide bars 1 connected at the front end of the machine by a head plate 3. The relation of each to the slide bars 1 is best illustrated in Fig. 9. The slide bars are movably mounted between pairs of rollers 6 and 7 respectively. These rollers are journaled upon supporting brackets 8 supported from the floor 10 by standards 9. The rollers 6 and 7 are grooved idle rollers, adapted to hold the slide bars 1 from lateral movement, while permitting them to freely move longitudinally.

The head plate 3 and the slide bars 1 are reciprocated by means of a crank wheel 12, preferably located below the floor 10 and adapted to transmit motion to the head plate 3 through crank pin 13, link rod 14, lever 15, link rod 16, and an auxiliary slide 17, movable mounted on the head plate 3 within a suitable housing guide 18. When the parts are in the position in which they are illustrated in Figs. 1, 2, and 4, slide 17 will first move rearwardly along the surface of the head plate 3, as indicated by the arrow in Fig. 4. This motion of the slide will be transmitted and utilized to actuate a set of work engaging members 20, 21, 22, and 23, to engage the work between them and a set of supporting rests as hereinafter described.

It will be observed that the slide 17 is provided with a set of posts 25 connected by toggle links 26, 27 and 28 with a set of rods 29 which extend along the slide bars 1 and are supported therefrom in suitable sleeve brackets or bearings. The motion of the slide is therefore transmitted to actuate these rods longitudinally through the posts 25, links 26, 27 and 28. Motion is also transmitted from one of the rods 29 to the work engaging member 20 through a lever 31 fulcrumed at 33 to a suitable support or bracket 34 projecting from one of the slide bars 1. The motion of rods 29 is also transmitted to the work engaging members 21 and 22 through bell cranks 37 and 38 respectively, said bell cranks being fulcrumed at 40 to brackets 41 similar to the brackets 34 above mentioned. Similarly, the work engaging members 23 may be actuated from the rods 29 through bell cranks 45. These various work engaging members are adapted to coöperate in holding the work in engagement with the relatively fixed work supports 47 and 48 also carried by the main slide or conveyer. The support 47 is connected directly with head plate 3, whereas the supports 48 are directly connected with the slide bars 1 by brackets 51, preferably similar in form to the brackets 41.

Each of the levers 31, 37, 38, and 45, preferably has one arm, or portion of an arm, downwardly inclined, this being the arm or portion which supports the work engaging member. The inclined arms or portions of these levers are marked 31ª, 37ª, 38ª, and 45ª, respectively. The arms 47ª and 48ª upon which the relatively fixed work supporting members are mounted are similarly downwardly inclined, whereby, when the main slide is passed over the surface of the bed 55 of a press, it is adapted to carry the blank in a horizontal position in close proximity to the upper surface of the matrix walls 56 as clearly shown in Fig. 8.

Initially, the blank will preferably be deposited by the workmen or by a suitable conveyer (not shown) with one margin bearing upon the relatively fixed rests 47 and 48, while both the main slide and the auxiliary slide are retracted. The auxiliary slide is then moved rearwardly to actuate the several levers and carry the work engaging members 20, 21, and 22 into contact with the blank. If desired, this may take place before the work is released by the workmen or conveying means. Some of these work engaging members, i. e., the members 20 and 22, may be formed to engage corners of the blank in pressure contact upon a plurality of its margins, whereby the blank may be accurately positioned.

The work engaging members 23 are preferably electro-magnetic. These are moved inwardly to engage the completed work preparatory to removing it from the press, simultaneously with the blank gripping movements of the members 20, 21, and 22. The main slide then moves rearwardly a distance at least equal to the length of the blank and ordinarily a somewhat greater distance, the completed work being thus removed from the press and a flat blank being substituted upon the matrix preparatory to a shaping operation. The flat blank A illustrated in the drawings is a sheet metal blank adapted to be shaped in the press to form a side bar for an automobile frame. A fragment of a shaped blank or bar is shown at B in Fig. 5.

When one of the frame bars B has been removed from the press and a blank A deposited upon the matrix 56, as illustrated in Fig. 8, the crank wheel 12 will have completed a half turn from the initial position, and during the next half turn, the movements of the parts will be reversed. The auxiliary slide 17 will then be first retracted from the head 3 to a position relative to said head similar to that indicated in Fig. 4. This movement is transmitted to retract the work engaging members 20, 21, 22, and 23, thereby releasing the completed work and also releasing the blank which has been deposited upon the matrix. The initial retractive movement of slide 17 interrupts an electric circuit which includes the magnets 23, thus deënergizing the magnets and allowing them to be retracted from the work. This circuit will be reëstablished when slide 17 again moves inwardly to set members 23 in work engaging position, as hereinafter explained.

After slide 17 has been retracted relatively to the head 3, this slide and also the main slide will move to the initial position, i. e., to blank receiving position, with the members 23 in position to swing into engagement with the completed work as soon as the operation of the press upon the blank has been completed by the movement of the punch 57 into and out of the matrix and the delivery of the work from the matrix by the knock-out plate 58. The press may be of any ordinary construction and therefore requires no further description.

The latch mechanisms.

In the initial position, i. e., the position indicated in Fig. 4, both slides are locked together temporarily by a spring actuated latch pin 62. The main slide is also locked to the frame by a spring actuated latch pin 63 which then engages in a socket 64 in the fixed frame bar 65. In the rearward position of the slide 17, it may be locked to head plate 3 by a spring actuated latch pin at 68, (Fig. 7), similar to latch pin 62 and when the main slide is in its rearward position, it may be locked to the frame by a latch pin 69 similar to the latch pin 63. The latch pin 69 is adapted to engage in a socket 70 in a frame bar 71, corresponding to frame bar 65 but reversed in position. Each of these frame bars 65 and 71 are provided with an inclined wing flange 72 upon which the engaging latch pin may slide, and which by reason of its inclined position, is adapted to lift the latch pin into position for engagement in the frame bar socket when the movement of the main slide carries the latch pin into position for registry with such socket.

Assuming the parts to be in the position indicated in the Figs. 4 and 6, and assuming the crank pin 13 to be approaching the horizontal plane of the crank shaft on the upwardly moving side, a shoe 75 carried by crank wheel 12 will then move into engagement with a roller 78 carried by an arm 79 which projects into the path of the shoe from rock shaft 80. The downward movement of the roller 78, under the pressure of the shoe, will be transmitted to latch pin 62 through lever 79, rock shaft 80, arm 81, link 82, and hook arm 83, the latter having a horizontally projecting fork 84 at its upper end, between the arms of which, latch pin 62 is carried when the main slide completes its forward movement. When slide 17 completed its independent forward movement, latch pin 62 moved upwardly and engaged in the socket 85 formed in the under surface of slide 17. When the main slide moved to Fig. 6 position, the head 86 at the lower end of the pin 62 was brought substantially in contact with the fork arms as best shown in Fig. 6, and it is therefore obvious that, when motion is transmitted from shoe 75 to this pin, the latter may be withdrawn from slide 17. Shoe 75 is of sufficient length to keep the latch pin 62 retracted until slide 17 has moved rearwardly to carry the socket 85 out of registry with pin 62.

It will also be observed in Fig. 6 that slide 17 is provided with a slot 90 through which the latch pins 63 and 69 pass. The upper portion of this slot is enlarged and adapted to receive lifting blocks 91 and 92 carried by these pins. The front face of the block 91 is beveled at 94 and the rear face of block 92 is similarly beveled at 95. The end walls of the slot are correspondingly beveled, and when slide 17 is unlocked by retraction of pin 62, it will move independently of the main slide until the beveled front wall 97 of the slot 90 engages and lifts block 91, thereby retracting pin 63 and unlocking the main slide from frame bar 65. Before this occurs, however, the rearward movement of the auxiliary slide 17 will have actuated all of the work engaging members 20 to 23 inclusive into work engaging position as above explained.

During the independent rearward movement of slide 17, the beveled rear wall 95 of its slot 90 will be withdrawn from underneath the lifting shoe 92, thereby releasing locking pin 69 and allowing the latter to assume the position in which it is illustrated in Fig. 7. And as slide 17 completes its independent movement, latch pin 68 enters socket 101 in said slide as also shown in Fig. 7, thereby again locking this slide to the main slide, after which both slides will move rearwardly, the main slide being released by pin 63 simultaneously with the locking movement of pin 68, or substantially so.

After the slides have been locked together by pin 68 and moved rearwardly to carry the completed work away from the press and substitute another blank upon the matrix thereof, crank wheel 12 will have completed a half turn from the position in which it is shown in Fig. 2, whereupon motion will be transmitted from crank wheel shoe 76 to retract locking pin 68 by means of a fork arm 105 which is similar to the fork arm 83 and which is operated from rock shaft 80 through link rod 106 in the same manner that link rod 82 is actuated from said shaft. The motion of the main actuating lever 15 will thereupon be reversed, slide 17 will be drawn forwardly until it occupies the same relative position with reference to the main slide as that in which it is illustrated in Fig. 6, the position of latch pins 63 and 69 will be reversed from that illustrated in Fig. 7 to that illustrated in Fig. 6, and the main slide will move forwardly to blank receiving position. During the initial forward movement of slide 17, the work engaging members 20 to 23 inclusive will be retracted, the members 23 releasing the completed work and the members 20, 21, and 22 releasing the blank which has been deposited upon the matrix. These work engaging members then remain in retracted position until the continued movement of crank wheel 12 again reverses the direction of movement of lever 15.

Briefly reviewing the operation of my improved feeding mechanism, it will be understood that each rearward movement of the main slide will be preceded by a short rearward movement of the auxiliary slide 17 upon the main slide head piece 3, this movement being utilized to grip a blank to the front end portion of the main slide and to grip the completed work in the rear portion thereof, preparatory to the rearward movement of the main slide. Said rearward movement then follows to carry the blank to the press and deliver the work therefrom, after which the auxiliary slide moves forwardly independently of the main slide to release the blank and the work, and the main slide then returns to its initial position.

In order that the energizing circuit of the magnetic members 23 may be controlled in such a manner as to energize and deënergize the magnets forming part of said members 23, I provide an electrical circuit which includes these magnets and which has contact terminals 107 and 108 carried by the head piece 3 of the main slide in the path of a projection 109 carried by link 26, whereby, when slide 17 moves rearwardly, the circuit is closed by pushing contact 107 to contact 108. The reverse movement of slide 17 allows the contacts to separate by the resiliency of their supporting arms.

The specific construction and arrangement of the actuating mechanism, the latch mechanism and work gripping members is not regarded as essential to my invention, it being possible to devise a great variety of such mechanisms capable of the functions of the parts herein illustrated and described, and I therefore do not limit the scope of my claims to these structural details.

I claim—

1. Feeding mechanism, including the combination of a main slide, blank engaging members carried by one end portion of the main slide, work engaging members carried by the other end portion, means for reciprocating the main slide, and means for actuating the blank engaging and work engaging members in one direction preparatory to each movement of the main slide.

2. Feeding mechanism, including the combination of a main slide provided with blank engaging members supported from its front end portion, and work engaging members supported from its rear end portion, means for reciprocating the main slide, means for setting said blank engaging and work engaging members in gripping position preparatory to a movement of the main slide in one direction, and means for actuating said members to releasing position preparatory to a movement of the main slide in the opposite direction.

3. Feeding mechanism, including the combination of a main slide provided with blank engaging members supported from its front end portion, and work engaging members supported from its rear end portion, means for reciprocating the main slide, means for setting said blank engaging and work engaging members in gripping position preparatory to a movement of the main slide in one direction, and means for actuating said members to releasing position preparatory to a movement of the main slide in the opposite direction, said main slide being composed of a set of side bars connected at one end with each other and separated at the other ends of the slide, and said blank engaging and work engaging members being adapted to operate between said side bars, whereby the work may be deposited from between the bars when said members are moved to releasing position.

4. Feeding mechanism, including the combination of a main slide provided with mechanical blank engaging members in one end portion thereof, electro-magnetic work engaging members in the other end portion thereof, actuating mechanism for the main slide provided with auxiliary devices for actuating the blank engaging members to blank gripping position, and also energizing the electro-magnetic devices preparatory to the movement of the main slide in one direction and retracting said gripping devices and deënergizing said electro-magnetic devices preparatory to the movement of the main slide in the opposite direction.

5. Feeding mechanism, including the combination of a main slide provided with carrying members for supporting and positioning a plate, means for reciprocating the main slide, and auxiliary means actuated by the first named means for actuating the carrying members preparatory to the movement of the main slide in either direction.

6. Feeding mechanism, including the combination of a main slide provided with carrying members for supporting and positioning a plate, means for reciprocating the main slide, an auxiliary slide operatively connected to move the carrying members into and out of carrying position, and means for actuating said auxiliary slide preparatory to the movement of the main slide in either direction.

7. In a feeding mechanism of the class described, a main slide provided with a head piece and two parallel bars projecting therefrom, in combination with a set of guiding rollers between which said parallel bars may travel, a set of carrying members supported from said bars, and means for actuating some of said carrier members and then actuating said slide longitudinally of its side bars.

8. The combination with a press, of a main slide having a set of side bars, blank engaging members supported from said side bars, means for reciprocating the slide along the bed of the press, means for actuating the blank engaging members into gripping position upon a blank preparatory to the movement of the slide in one direction, and means for actuating said members to releasing position preparatory to the movement of the slide in the other direction, said members, when moved to releasing position, being adapted to deposit the previously engaged blank upon the matrix of the press.

9. The combination with a press, of a main slide having a set of side bars, blank engaging members supported from said side bars, means for reciprocating the slide along the bed of the press, means for actuating the blank engaging members into gripping position upon a blank preparatory to the movement of the slide in one direction, means for actuating said members to releasing position preparatory to the movement of the slide in the other direction, said members, when moved to releasing position, being adapted to deposit the previously engaged blank upon the matrix of the press, said slide being also provided with electro-magnetic devices for engaging the completed work, and means for energizing and deenergizing said devices in synchronism with the blank engaging and releasing movements of the gripping members, whereby the previously completed work may be delivered from the press simultaneously with the delivery of an unshaped blank thereto.

10. Feeding mechanism, including the combination of a main carrier, work supporting and positioning members thereon, relatively movable work engaging and positioning members, and motion transmitting connections adapted for initial movement independently of the carrier and partially connected to actuate the relatively movable work engaging members into work engaging position preparatory to movement of the main carrier, in one direction, and out of work engaging position preparatory to movement of the main carrier in the opposite direction.

11. Feeding mechanism, including the combination of a main carrier, work supporting and positioning members thereon, relatively movable work engaging and positioning members, and motion transmitting connections adapted for initial movement independently of the carrier and partially connected to actuate the relatively movable work engaging members into work engaging position preparatory to movement of the main carrier, in one direction, and out of work engaging position preparatory to movement of the main carrier in the opposite direction, some of said work engaging members being electro-magnetic, and said connections being adapted to initially energize and deënergize the same preparatory to the work engaging and retractive movements of such members.

12. Feeding mechanism, including the combination of a main slide, carrying members, means for reciprocating the main slide, an auxiliary slide operatively connected to move the carrying members into and out of carrying position, and means for actuating said auxiliary slide preparatory to the movement of the main slide in either direction, said actuating means including means for locking the slides together preparatory to the movement of the main slide in either direction and releasing the auxiliary slide preparatory to its independent movement.

13. Feeding mechanism, including the combination of a main carrier provided with work engaging and positioning members, and actuating connections for the carrier adapted to move the engaging members into and out of work gripping position preparatory to carrier advancing and retractive movements respectively.

14. Feeding mechanism, including the combination of a reciprocating carrier provided with retractable work positioning devices, a carrier actuating member adapted for limited movement independently of the carrier, and connections for utilizing said independent movements to actuate the work positioning devices.

15. Feeding mechanism, including the combination of a reciprocating carrier provided with movable work engaging devices, a carrier actuating member adapted for limited movement independently of the carrier, connections for utilizing said independent movements to actuate the carrier, means for locking the carrier actuating member to the carrier at each end of its independent movement, and means connected with the crank, for releasing said actuating member for independent movement during a short interval following each half turn movement of the crank.

16. Feeding mechanism, including the combination of a reciprocating carrier provided with movable work engaging devices, a carrier actuating member adapted for limited movement independently of the carrier, connections for utilizing said independent movements to actuate the work engaging devices, driving mechanism for reciprocating the carrier, locking means adapted to automatically lock the actuating member to the carrier at each end of its independent movement, and lock releasing devices controlled, as to releasing operation, by said driving mechanism.

17. In a press for shaping sheet metal blanks, feeding mechanism, including the combination of a reciprocating carrier provided with work positioning devices, and actuating means for the carrier having a loose-motion connection with said carrier, whereby the positioning devices on the carrier are actuated preparatory to the feeding movement of said carrier.

18. In a press for shaping metal blanks, the combination of forming dies, feeding mechanism comprising a slide with movable engaging devices for positioning the blank between the dies of the press, with means for moving the slide to actuate the said devices and feed the blank into the press and the work therefrom.

19. In a forming press for shaping metal blanks, feeding mechanism comprising a main slide having devices for engaging and positioning the blank between the dies of the forming press, an auxiliary slide for operating the said devices and moving the main slide to feed the blank into and the work out from the press.

20. In a forming press for shaping sheet metal blanks, the combination of forming dies, mechanism comprising devices for engaging and positioning the blank between the forming dies and removing the work therefrom, and actuating means for said devices, the positioning devices having a movement relative to their support.

21. In a press for working sheet metal blanks, the combination of a set of dies for acting upon the blank, mechanism comprising devices for engaging and positioning the blank between the dies of the press and for removing the finished work therefrom, with actuating means for said mechanism, the positioning devices having a movement relative to their support.

22. In a press for working sheet metal blanks, a feeding mechanism consisting of a reciprocating carrier, relatively movable positioning devices for engaging the blank, means for successively moving the positioning devices into engagement with the blank, advancing the carrier, to place the blank in the press, retracting the positioning devices, and retracting the carrier to initial position, and other devices for removing the finished work from the press.

23. Feeding mechanism, including the combination of a reciprocating carrier, relatively movable work positioning devices, means for operating the said devices, and means for actuating the carrier.

24. In a work positioning and feeding mechanism, a reciprocating carrier, relatively movable work positioning devices, and means for actuating the carrier to operate the positioning devices.

25. In a work positioning and feeding mechanism, a reciprocating carrier, relatively movable work positioning devices, means for advancing and retracting the carrier, and means on the carrier for operating the work positioning devices.

26. In a drawing press, the combination of a set of forming dies for shaping a metal blank, with a carrier for feeding the blank between the dies, and actuating means therefor, such carrier having relatively movable devices thereon, for positioning the blank with reference to its support.

27. Mechanism for feeding blanks between the dies of a drawing press, comprising a slide and actuating means therefor, and supports for the blank carried by the slide, the said supports being provided with stepped portions which engage the underside of the blank and sustain the latter during the movement of the slide to feed the blank between the dies of the press.

28. Mechanism for feeding blanks between the dies of a drawing press and removing the work therefrom, comprising a main slide, blank supporting members carried by the said slide, means for positioning the blank upon the supporting members, devices carried by the slide for removing the finished work from the press, and means for actuating the slide.

29. A drawing press provided with a set of work shaping dies, means at one end of the press for supporting and feeding a metal blank into the press for action thereon by the dies, means for positioning the blank with respect to its support, means at the other end of the press for removing the finished work therefrom, and actuating devices for the said means.

30. Mechanism for feeding metal blanks to drawing presses, comprising a main slide, blank supporting members carried by the said slide, movable devices for positioning the blank upon the supporting members, and means for actuating the positioning devices and the slide.

In testimony whereof I affix my signature in the presence of two witnesses.

HENRY MILLER.

Witnesses:
J. J. STAMM,
C. FUCHS.